United States Patent
Gogic

(10) Patent No.: US 8,380,169 B2
(45) Date of Patent: Feb. 19, 2013

(54) SYSTEM AND METHOD FOR ENABLING TRANSACTION OF FEMTO CELL INFORMATION FROM A HOST TERMINAL DEVICE TO A GUEST TERMINAL DEVICE

(75) Inventor: Aleksandar M. Gogic, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 722 days.

(21) Appl. No.: 12/248,254

(22) Filed: Oct. 9, 2008

(65) Prior Publication Data

US 2009/0098858 A1    Apr. 16, 2009

Related U.S. Application Data

(60) Provisional application No. 60/979,800, filed on Oct. 12, 2007.

(51) Int. Cl.
*H04Q 7/24* (2006.01)
(52) U.S. Cl. .......................... 455/411; 370/338
(58) Field of Classification Search .................. 455/411; 370/338
See application file for complete search history.

(56) References Cited

U.S. PATENT DOCUMENTS

| | | | |
|---|---|---|---|
| 2006/0109827 A1 | 5/2006 | Zhang | |
| 2006/0212700 A1 | 9/2006 | Zhang | |
| 2007/0097939 A1 | 5/2007 | Nylander et al. | |
| 2007/0121536 A1 | 5/2007 | Aihara | |
| 2007/0183427 A1 | 8/2007 | Nylander et al. | |
| 2007/0238448 A1 | 10/2007 | Gallagher et al. | |

FOREIGN PATENT DOCUMENTS

| | | |
|---|---|---|
| CN | 1801650 A | 7/2006 |
| JP | 11069410 A | 3/1999 |
| JP | 2001320755 A | 3/1999 |
| JP | 2005295000 A | 10/2005 |
| JP | 2006524005 A | 10/2006 |
| JP | 2007259082 A | 10/2007 |
| JP | 2007266963 A | 10/2007 |
| RU | 2006104107 | 7/2006 |
| RU | 2304853 C2 | 8/2007 |
| WO | WO2005062645 A1 | 7/2005 |
| WO | WO2005074310 A1 | 8/2005 |
| WO | WO 2006106393 A2 | 10/2006 |

OTHER PUBLICATIONS

International Search Report & Written Opinion—PCT/US2009/079575, International Search Authority—European Patent Office—Feb. 18, 2009.
Taiwan Search Report—TW097139234—TIPO—May 21, 2012.

*Primary Examiner* — William D Cumming
(74) *Attorney, Agent, or Firm* — Florin C. Corie

(57) ABSTRACT

A method for managing access to a macro mobile operator core network (250) by a guest terminal device (225) through a femto cell (210), and more particularly through a femto cell (210) connected to the Internet (240). When a guest terminal seeks guest access to network services at a site for example while a guest at a person's home, or a customer in a shop, or a traveler in a transportation station, access may be granted by information exchange between the proprietor of the site and the macro mobile operator core network (250). Access may be granted via the proprietor via a terminal device (220) connected wirelessly to the core network, or by any device connected to the Internet. Once access is granted, the guest terminal device (225) receives sufficient information to initiate communication with femto cells (210) in the proximity of the site, and thereby begin using Internet-based communication.

28 Claims, 11 Drawing Sheets

SYSTEM AND METHOD FOR ENABLING TRANSACTION OF FEMTO CELL INFORMATION FROM A HOST TERMINAL DEVICE TO A GUEST TERMINAL DEVICE

The present Application for Patent claims priority to Provisional Application No. 60/979,800 entitled "SYSTEM AND METHOD FOR ENABLING TRANSACTION OF FEMTO CELL INFORMATION FROM A HOST TERMINAL DEVICE TO A GUEST TERMINAL DEVICE" filed Oct. 12, 2007, and assigned to the assignee hereof and hereby expressly incorporated by reference herein.

BACKGROUND

1. Field

The present application relates generally to wireless communications, and more specifically to methods and systems for the transaction of information related to access point base stations to guest terminals.

2. Background

Wireless communication systems are widely deployed to provide various types of communication (e.g., voice, data, multimedia services, etc.) to multiple users. As the demand for high-rate and multimedia data services rapidly grows, there lies a challenge to implement efficient and robust communication systems with enhanced performance.

In recent years, users have started to replace fixed line communications with mobile communications and have increasingly demanded greater voice quality, reliable service, and lower prices.

In addition to mobile phone networks currently in place, a new class of small base stations has emerged that may be installed in a user's home and provide indoor wireless coverage to mobile units using existing broadband Internet connections. Such personal miniature base stations are generally known as access point base stations or, alternatively, Home Node B (HNB) or, alternatively, femto cells. Typically, such miniature base stations (femto cells) are connected to the Internet and the mobile operator's network via a router or modem.

However, one of the critical problems with femto cells is "discovery", namely how a mobile device gains awareness of, and authorization access to a femto cell. Frequent scanning across frequencies may be used, but that technique may drain the battery in the device. Depending on the femto system solution used, the mobile unit may not know if it is allowed to use a particular femto cell or not, at least not until the mobile unit attempts to register with the femto cell. This results in further battery drainage.

It is these and other limitations of such prior attempts that motivate the present invention disclosed herein.

DETAILED DESCRIPTION

The word "exemplary" is used herein to mean "serving as an example, instance, or illustration." Any embodiment described herein as "exemplary" is not necessarily to be construed as preferred or advantageous over other embodiments. The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). These various radio technologies and standards are known in the art.

In the description herein, a node that provides coverage over a relatively large area may be referred to as a macro node while a node that provides coverage over a relatively small area (e.g., a residence) may be referred to as a femto node. It should be appreciated that the teachings herein may be applicable to nodes associated with other types of coverage areas. For example, a pico node may provide coverage over an area that is smaller than a macro area and larger than a femto area (e.g., coverage within a commercial building). In various applications, other terminology may be used to reference a macro node, a femto node, or other access point-type nodes. For example, a macro node may be configured or referred to as an access node, base station, access point, eNodeB, macro cell, and so on. Also, a femto node may be configured or referred to as a Home NodeB, Home eNodeB, access point base station, femto cell, and so on. In some implementations, a node may be associated with (e.g., divided into) one or more cells or sectors. A cell or sector associated with a macro node, a femto node, or a pico node may be referred to as a macro cell, a femto cell, or a pico cell, respectively. A simplified example of how femto nodes may be deployed in a network will now be described with reference to FIGS. 1 and 2.

Figure 1:
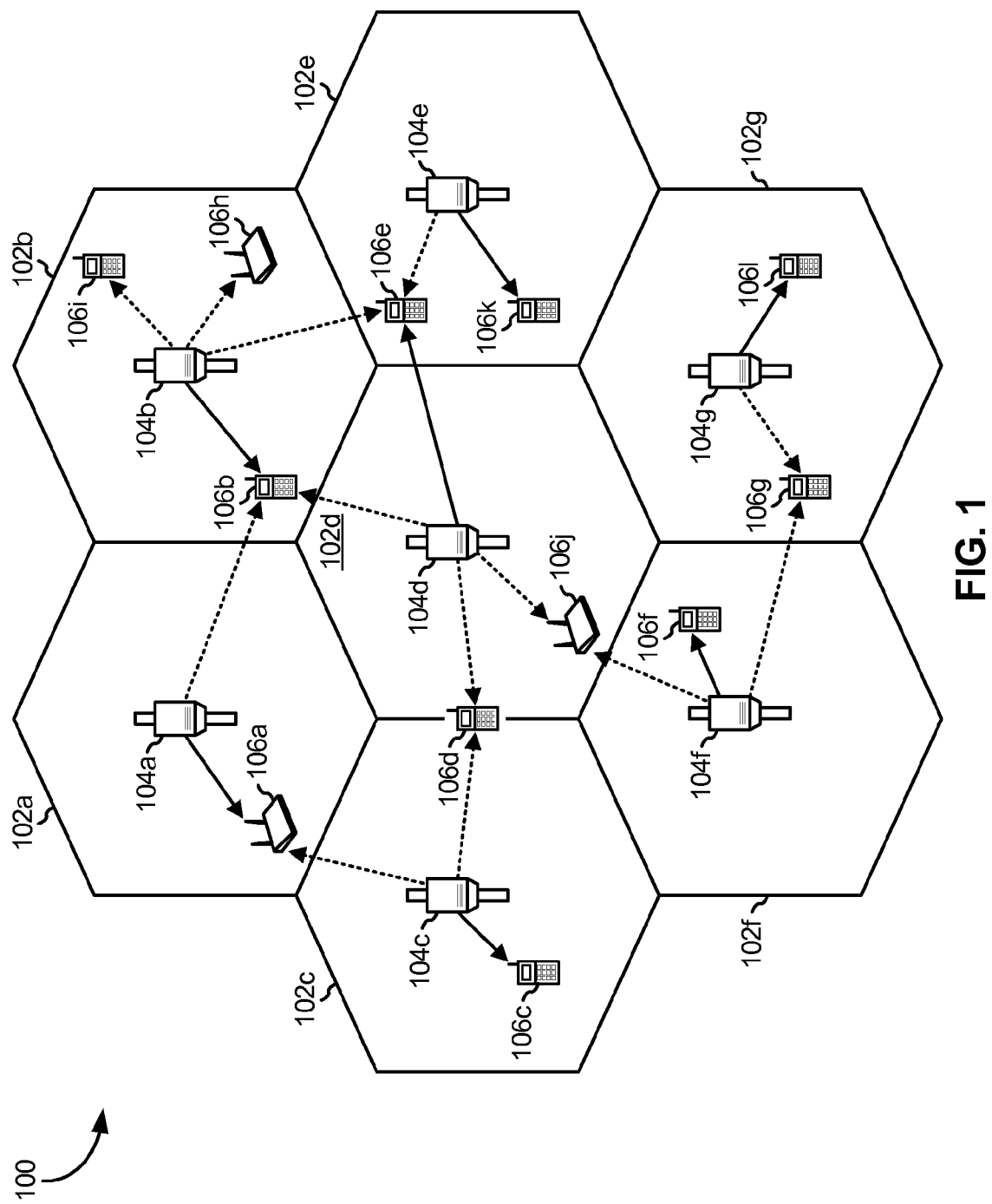
FIG. 1 illustrates an exemplary wireless communication system including femto cells, according to one embodiment.

FIG. 1 illustrates an exemplary wireless communication system 100 configured to support a number of users, in which various disclosed embodiments and aspects may be implemented. As shown in FIG. 1, by way of example, system 100 provides communication for multiple cells 102 such as, for example, macro cells 102a-102g, with each cell being serviced by a corresponding access point (AP) or points 104, such as, for example, APs 104a-104g. Each macro cell may be further divided into one or more sectors (not shown). As further shown in FIG. 1, various access terminal (AT) devices 106, including ATs 106a-106l, also known interchangeably as user equipment (UE) or as mobile stations (MS), or as terminal devices, may be dispersed at various locations throughout the system. Each AT 106 may communicate with one or more APs 104 on a forward link (FL) and/or a reverse link (RL) at a given moment, depending upon whether the AT is active and whether it is in soft handoff, for example. The wireless communication system 100 may provide service over a large geographic region. For example, macro cells 102a-102g may cover only a few blocks within a neighborhood or several square miles in a rural environment.

Figure 2:
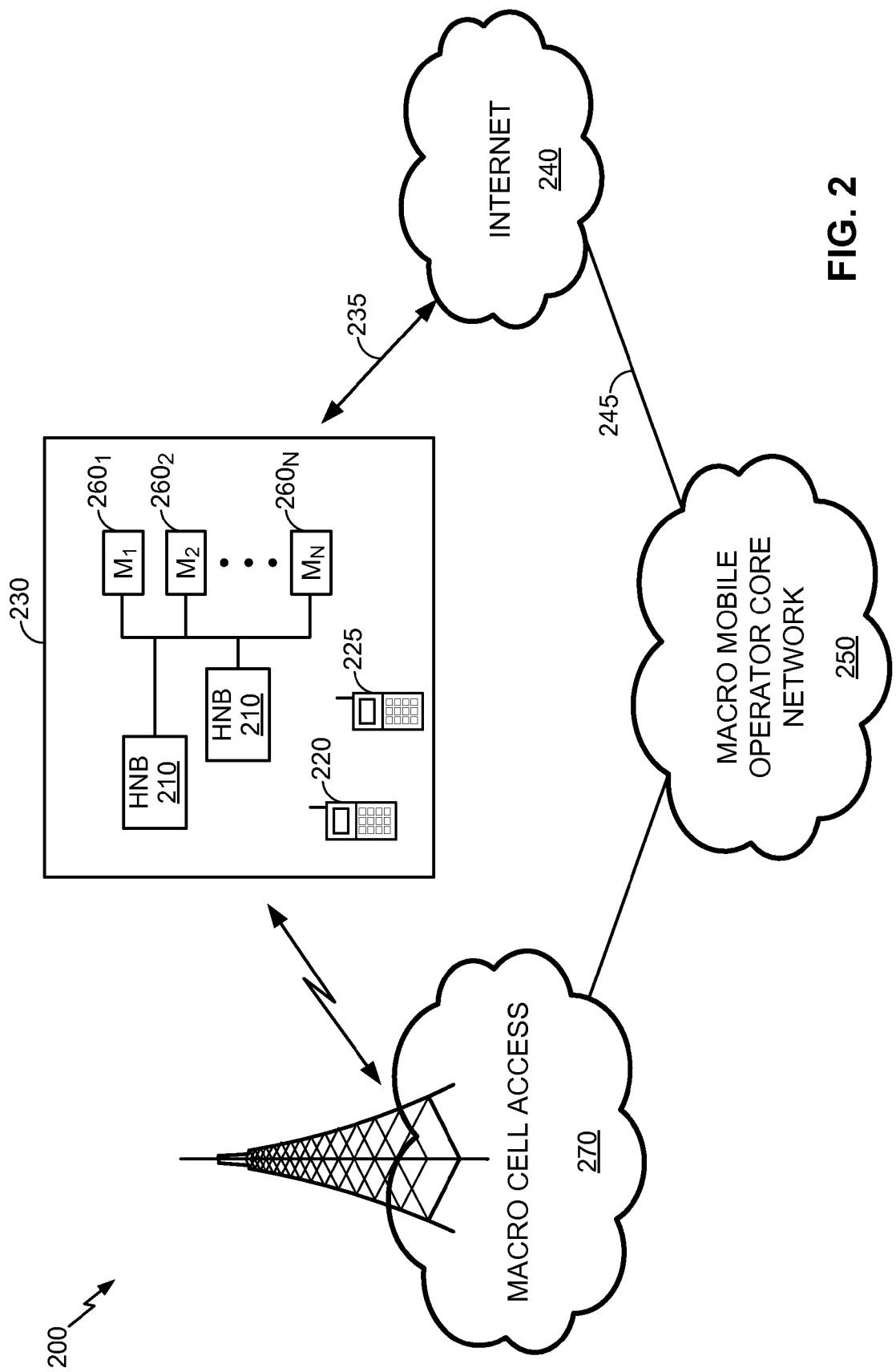
FIG. 2 illustrates an exemplary communication system to enable deployment of femto cells within a network environment, according to one embodiment.

FIG. 2 illustrates an exemplary communication system to enable deployment of femto nodes, also known as femto cells (access point base stations) within a network environment. As shown in FIG. 2, the system 200 includes multiple femto nodes, or, in the alternative, femto cells, access point base stations, Home Node B (HNB) units such as, for example, HNB 210, each being installed in a corresponding relatively small coverage network environment, such as, for example, in one or more sites 230, and such as, for example, being configured to serve associated user equipment 220, as well as alien user equipment 225. Each HNB 210 may be coupled to and further configured to communicate via a wide area network, such as the Internet 240, and to any node on the Internet, including a macro mobile operator core network 250 (also referred to as a "core network"). In exemplary configurations, a site might include DSL routers and/or cable modems $260_1$, $260_2$, through $260_N$. As shown, there are at least two communication paths between a terminal device 220 and the macro mobile operator core network 250, namely a path including macro cell access 270, and a path including the Internet 240.

Although embodiments described herein use 3GPP terminology, it is to be understood that the embodiments may be applied not only to 3GPP (Re199, Re15, Re16, Re17, etc.) technology, but also to 3GPP2 (1xRTT, 1xEV-DO Re10, RevA, RevB, etc.) technology, as well as to other known and related technologies. In such embodiments described herein, the proprietor of the HNB 210 might subscribe to mobile services such as, for example, 3G mobile services, offered through the macro mobile operator core network 250, and the UE 220 might be capable of operating both in a macro cellular environment and in an HNB-based small coverage network environment. Thus, the HNB 210 might be adapted for backward compatibility with any existing UE 220.

As is apparent from the foregoing, in addition to network access being served directly by the macro mobile operator core network 250, the UE 220 might be served network access indirectly by one or more HNBs. In such a case, end-to-end communication between the UE 220 and the macro mobile operator core network 250 may be performed through an HNB 210 and through the Internet 240. One or more UEs might be granted access by one or more pre-authorized HNBs 210, namely the HNBs 210 that are licensed or under a subscription for use within proximity of the corresponding site 230.

One of the use models for HNBs (henceforth "femto cells") includes "restricted association". That is, while one or more femto cells are pre-associated and authorized to grant network access to a compatible UE (henceforth "terminal" or "terminal device") that is licensed to or under subscription by the proprietor of the site where it is installed (e.g. in a person's home), those same femto cells would disallow network access to any other (e.g. un-associated or alien) cellular network subscriber(s). This restricted association or disallowed network access of course covers alien terminal devices, which, but for the features of the restricted association model, might be able to gain network access by a given femto cell. That is, even in the presence of an alien terminal device that is compatible with the femto cell technology, and being subscribed on the cellular network licensed for the spectrum used by the femto cell, and being in the physical vicinity (within coverage) of the femto cell, the alien terminal device is disallowed access to proximal femto cells unless and until the alien terminal is identified and granted access.

One feature of the restricted association model is to explicitly allow a guest terminal to communicate with the femto cell (or, more generally, communicate with any among a plurality of femto cells), and gain authorized network access to the Internet 240 and thereby to the macro mobile operator core network 250 via connection 245. In this context, the guest terminal might be any user equipment other than the aforementioned pre-associated terminal devices. Such explicit allowance (henceforth "guest status") might be granted either on a time-period-limited basis, or on a time-wise open-ended basis.

In one embodiment, a terminal device might be pre-associated with specific femto cell use. In such embodiments, the terminal device may store information associating that terminal device to specific femto cell(s) that the terminal device is allowed to use. This information can be represented and stored in a number of forms and with various fields and contents, depending upon the particular solution. Table 1 depicts one possibility for such representation in a relational database form. The data populated in Table 1 corresponds to a possible exemplary femto cell to terminal device association as shown in FIG. 1.

TABLE 1

| Row | Terminal Device ID | Femto Cell ID |
|-----|--------------------|----------------|
| 1   | 106e               | 104e           |
| 2   | 106k               | 104e           |
| 3   | 106g               | 104g           |
| 4   | 106l               | 104g           |

Table 1 thus represents associations between specific terminal devices and one or more femto cells. In the example shown, each of four terminal devices (106e, 106k, 106g, and 106l) are given an association with one or more femto cells. Of course the associations between a terminal device and femto cells are not limited to just two each as shown in the table rows 1-2 and rows 3-4, and indeed any terminal device might have a row/record that creates an association with additional femto cells. Moreover, additional relations might be available that define a relation between a particular core network subscriber and zero or more femto cells licensed to that subscriber. In an alternate embodiment, several relations might be joined in order to create, for example, a relation between a particular subscriber and zero or more terminal devices ("subscriber terminal device").

Now, continuing the discussion of the restricted association use model, the macro mobile operator core network 250 might store a database similar to Table 1, indicating which terminal devices are authorized for access to which femto cells. In one embodiment, a guest terminal device might be entered into this database, possibly including additional guest status authorization, and possibly including information describing a period of validity of a guest's status. Thus, if and when the valid guest status period expires, the guest status information might be marked as invalid or inactive, or removed from the particular network database. Therefore, a subsequent attempt by the guest terminal device to access the network via the femto cell might be rejected, and the guest terminal device might be directed to use an alternate network access method. Alternatively, the guest terminal device might be allowed to continue to use the femto cell, but with access restrictions such as limited bandwidth, or with access constraints such as tariffs as may be applied by the operator of the macro mobile operator core network 250.

Additional embodiments described in detail below enable transaction of the information which allows a guest terminal device to find a licensed femto cell when the guest terminal device is proximal to the installed site. In one embodiment, a femto cell database entry ("FDE") is used. When an FDE is stored in a home terminal device, the FDE is designated as a "Home FDE", and when stored in a guest terminal device, it is designated as a "Guest FDE", and when an FDE is stored in a core network, the FDE is designated as a "Core FDE", even though the information in each or any combination of the aforementioned FDEs might be identical. Of course a terminal device may store the Home FDE as just described, and may also contain other FDEs or even other similarly structured information about other femto cells it is allowed to access. For example, in addition to a Home FDE, the user's network terminal device might contain an FDE associating it with femto cells installed at the user's place of business.

Figure 3:
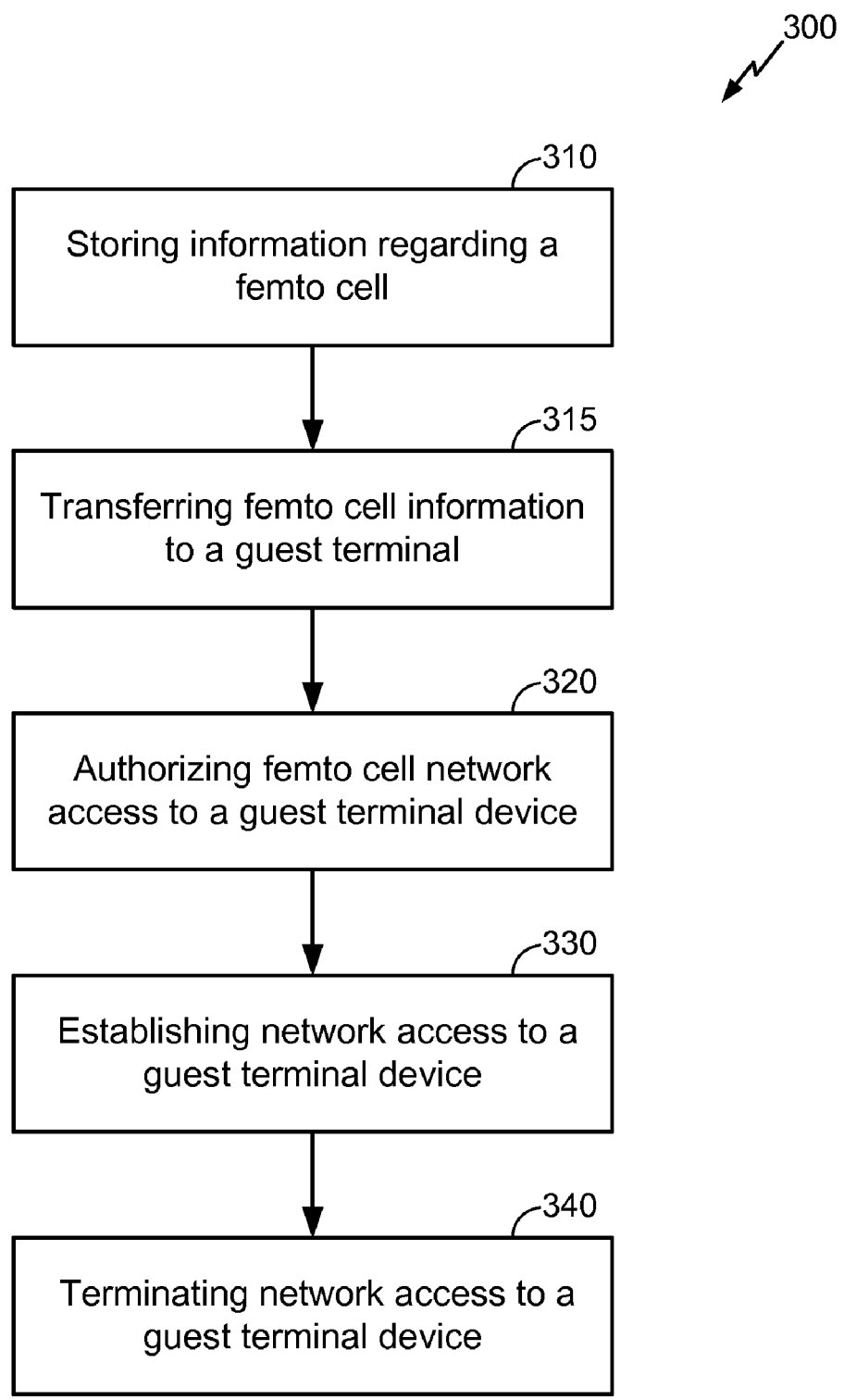
FIG. 3 illustrates a flow diagram of a system for enabling transaction of femto cell information from a host terminal device to a guest terminal device, according to one embodiment.

Somewhat more formally, the foregoing method is depicted by flow diagram for a system 300, as shown in FIG. 3. Specifically, a method for enabling the transaction of femto cell information from a host terminal device to a guest terminal device might include operations including storing information regarding a femto cell (see operation 310), transferring said information regarding said femto cell to a guest terminal device (operation 315), authorizing femto cell network access to a guest terminal device (operation 320), and establishing network access to a guest terminal device (operation 330). As shown, the operation of authorizing femto cell network access and the operation of establishing femto cell network access are distinct and separate operations, and merely authorizing network access need not require establishing network access. Of course, authorizing femto cell network access to a guest terminal device may not be a permanent authorization, accordingly the system 300 includes an operation for terminating network access to a guest terminal device (340).

Figure 4:
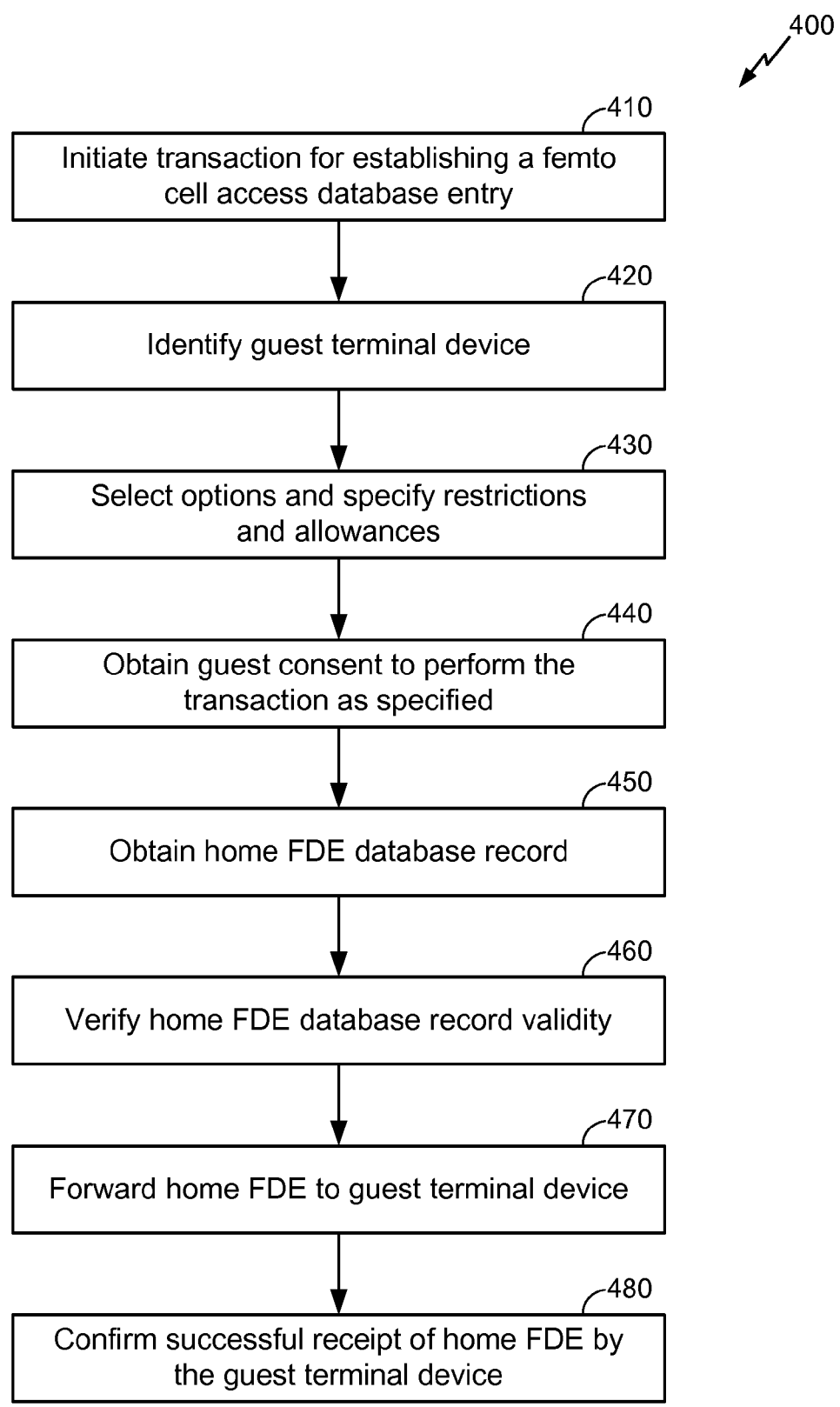
FIG. 4 illustrates a flow diagram of an exemplary system for establishing an access database entry, according to one embodiment.

FIG. 4 is a flow diagram for a system 400 for establishing an access database entry, in accordance with one embodiment. As an option, the present system 400 may be implemented in the context of the architecture and functionality of FIG. 1 through FIG. 3. Of course, however, the system 400 or any operation therein may be carried out in any desired environment.

Inasmuch as the system 300 and the system 400 are flexible so as to support a wide variety of features, various techniques to initiate a transaction from a host terminal device for establishing an access database entry are also flexible. In fact, the transaction might be initiated using a mobile terminal device that is licensed (or covered under subscription) to a proprietor of a site where femto cells are installed. Or it might be initiated by a request for access from an unlicensed device, either mobile or not mobile, as long as the proper protocol is obeyed (see operation 410). This unlicensed device might be a desktop or laptop or any other computing device capable of executing browser code or browser-like code. In some embodiments, it is even possible that the device used in initiating the transaction might be a mobile terminal device licensed to someone other than the proprietor of the subject site.

In any of these cases, the identity of the subscriber or licensee of the femto cells involved in the transaction may be retrieved in the course of the transaction protocol, and subsequently used for allocation of charges and other purposes. In many examples discussed, it is convenient to consider the "home user" as referring to the same person (or entity) as the person (or entity) that is the proprietor of the site where the subject femto cells are installed. However, it is understood that the election of when to initiate a transaction might be "ad hoc" (e.g. shortly after the guest indicates a need for femto cell access), or the transaction could be initiated a priori, and even in a batch. It is even possible that a transacting user could be any person or entity able to provide proper credentials (see operation 420). In one embodiment, the transacting user might be a core network employee or agent (human agent or computing agent) authorized to "sign up" a group of guests. Such might be the case when, for example, a conference organizer elects to preauthorize femto cell access within the conference facility, but only to specific attendees who have elected (or paid) for such a service (henceforth "preauthorized guest" or "preauthorized guests").

Continuing, the transacting user can invoke an application capable of executing in the user's terminal device (for example, this application may be a BREW application by Qualcomm Incorporated of San Diego, Calif.). Or, the transacting user can invoke an application or applet from the aforementioned unlicensed device. In one embodiment, this type of transaction is a billable event and the macro mobile operator core network 250 operator might extract revenue merely for performing the transaction, even independent of any subsequent network usage. In exemplary embodiments, the aforementioned application might present (e.g. through a graphical user interface) a series of options, including but not limited to (a) a maximum duration of period of guest access validity; (b) a duration of period of guest access validity for which access is tariff-free; (c) explicit restrictions (e.g. access to an Internet address, or an Internet application is restricted); or (d) explicit allowances, for example a call to 9-1-1 might be permitted at any time (see operation 430). Of course such an application or applet might present default configurations or groupings of configurations or modes, possibly including a restricted mode, a promiscuous mode, a tariff-free mode, etc., and might involve many transactions subordinate to operation 430. Conversely any explicit transaction by the applet to the core network might be merely an option. Those skilled in the art will immediately recognize that the execution of an application or applet might involve any number of network accesses, and a protocol for communication between a client (e.g. a terminal device) and a server (e.g. a core network) and might include any number of client-server transactions.

Now, with the credentials of a valid subscriber being validated, the transacting user might identify a guest user, for example by providing the phone number of the guest user's terminal device. In one embodiment, the information requested and provided by the transacting user might be limited to merely the phone number of the guest user's terminal device. Of course other means of identification of the guest user's terminal device are readily available, and any such identification technique(s) might be used in order to uniquely address the guest user's terminal device on any available network.

The core network, thus having (a) a properly credentialed subscriber, (b) a database including the relationship between a subscriber and zero or more femto cells, and (c) the ability to address the guest user's terminal device, might then engage the guest user, through the guest user's terminal device via one or more confirmation exchanges, possibly including guest confirmations that optionally contain the amount of time for guest activation validity, any un-tariffed time limitations, explicit restrictions, and explicit allowances (see operation 440).

Upon obtaining the guest user's consent, the macro mobile operator core network 250 retrieves the Home FDE corresponding to the previously credentialed proprietor. Such retrieval might be performed autonomously by the macro mobile operator core network 250 via a request of the home terminal for its Home FDE or, in the case the authorizing transaction having been performed using an unlicensed terminal (browser device), such retrieval might be performed autonomously by the macro mobile operator core network 250 through a database access initiated within the macro mobile operator core network 250 (operation 450). In either case, the core network verifies the contents of the retrieved FDE (operation 460) and forwards it, using a path including macro cell access 270 to the guest terminal device, where the guest terminal device formulates it as a Guest FDE and stores it (operation 470). Upon confirmation of a successful download as reported by the guest terminal device (operation 480), the macro mobile operator core network 250 establishes an access database entry indicating a guest subscription having the capabilities, limitations, and explicit allow/deny characteristics as aforementioned.

Now, returning to FIG. 3, the operation 310 includes establishment of at least one access database entry, possibly including an FDE, and possibly including some or all allow/deny characteristics. In some embodiments, the access record might be stored in memory, or it might be stored into or onto some non-volatile device. However, within the scope of operation 310, even though an access entry has been established, guest terminal access to a subject femto cell has not yet occurred. Indeed, as recently as the performance of operation 480, the guest terminal device remains connected to the macro mobile operator core network 250 via a network path including a macro cell access 270. Various embodiments provide for the guest terminal to terminate the aforementioned macro cell connection and begin accessing the macro mobile operator core network 250 via a network path including a femto cell and the Internet 240 (see operations 320 and 330, and operation 620).

Figure 5:
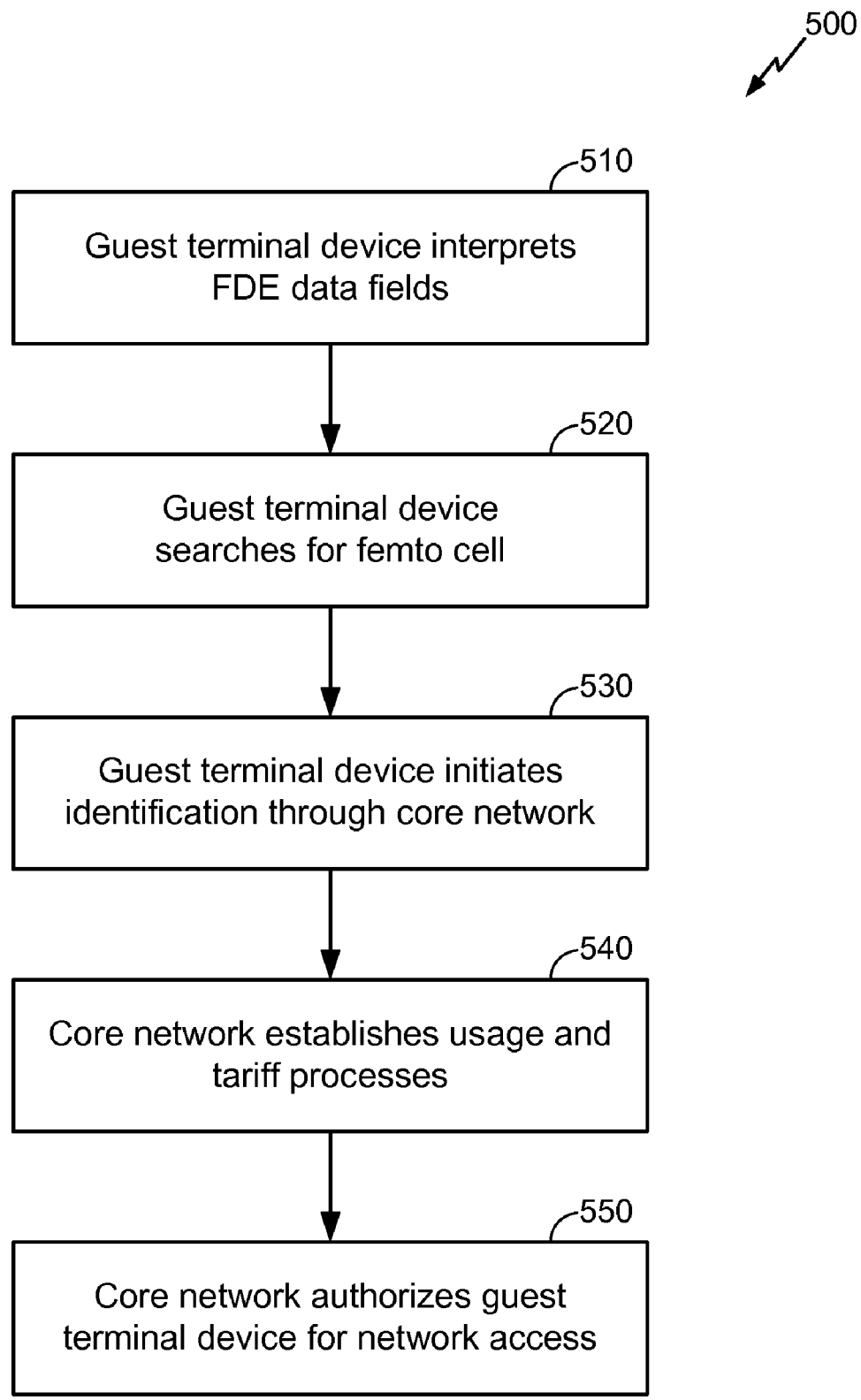
FIG. 5 illustrates a flow diagram of an exemplary system authorizing femto cell network access to a guest terminal device, according to one embodiment.

FIG. 5 is a flow diagram for a system 500 for authorizing femto cell network access to a guest terminal device, in accordance with one embodiment. As an option, the present system 500 may be implemented in the context of the architecture and functionality of FIG. 1 through FIG. 4. Of course, however, the system 500 or any operation therein may be carried out in any desired environment.

As per the discussion of operation 470, the guest terminal device has received a copy of a Home FDE as a result of the execution of one or more of operations 410 through 470. At this point, the guest terminal device might interpret the contents of the just received FDE. In some embodiments, the guest terminal device might interpret the FDE data fields (see operation 510) to the extent that a logical map of one or more femto cells might be constructed. Such a map might contain information on a per-femto-cell basis; Table 2 shows just one of many mapping possibilities.

TABLE 2

| Femto Cell ID | Status | Chip | User-specified Location |
|---|---|---|---|
| 104e | Up (28 days) | 0X1234ABCD | Kitchen |
| 104g | Up (3 days) | 0XABCD0123 | Garage |

The values populated into the cells of Table 2 correspond to the femto cells found in FIG. 1. Of course this is strictly an example and many other mappings are possible and envisioned. In fact a local femto cell constellation database containing information related to the location of the femto cells in the constellation might be constructed by the guest terminal, an example of which is shown in Table 3.

TABLE 3

| SID/NID | Femto ID | Macro BS Set | Pilot Ec/Io Threshold Vector | Mean Pilot Phase Vector | Pilot Phase Deviation Vector |
|---|---|---|---|---|---|
| A | $A_1$ | $C(A_1)$ | $D(A_1)$ | $P(A_1)$ | $Q(A_1)$ |
| A | $A_2$ | $C(A_2)$ | $D(A_2)$ | $P(A_2)$ | $Q(A_2)$ |
| A | $A_3$ | $C(A_3)$ | $D(A_3)$ | $P(A_3)$ | $Q(A_3)$ |

In the case of such a constellation database being constructed, the guest terminal device might request various constellation data from the macro mobile operator core network 250, and the guest terminal device might then interpret and store such data for various uses. At any time once an FDE is stored in the guest terminal, the guest terminal may then possess the necessary information to search for and initiate communication with at least one femto cell in the proximal femto cell network (see operation 520). In exemplary embodiments, a guest terminal recognizes the condition of being in the vicinity of one or more particular femto cells as described by any FDE, and begins an active search for such femto cells. Of course, any value or combination of values from among an SID/NID, a Macro BS Set, a Pilot Ec/Io Threshold Vector, a Mean Pilot Phase Vector, and/or a Pilot Phase Deviation Vector may aid the guest terminal in detecting the condition of being in the vicinity one or more femto cells, and may aid the guest terminal in finding a subject femto cell. Once communication with one or more subject femto cells is acquired, additional information in the FDE (including parameters such as BASE_ID, LAT, LON, etc) may positively identify the subject femto cell, at which point authentication of the guest device authentication of the guest device may be confirmed, and authorization to use the femto and authorization to use the femto may be granted.

Still in the context of the system 500 for authorizing femto cell network access to a guest terminal device, the macro mobile operator core network 250 might initiate recordkeeping for the guest terminal device such that LUDs, time-based usage, and data rate based usage, etc might be measured (operation 540). Now, with identification and authentication completed and recordkeeping processes initiated, the macro mobile operator core network 250 authorizes the guest terminal and any femto cell to allow access by the guest terminal device (operation 550). The guest terminal device is now authorized for network access to the macro mobile operator core network 250 through the network path segments 235 and 245 including at least one femto cell, and at least one path (not shown) through the Internet 240. The guest terminal device can now attempt communication with a selected femto cell. The guest terminal may use any network paths and core network facilities so authorized, including network access to the macro mobile operator core network 250 through the network path including at least one femto cell, and at least one path through the Internet 240.

Figure 6:
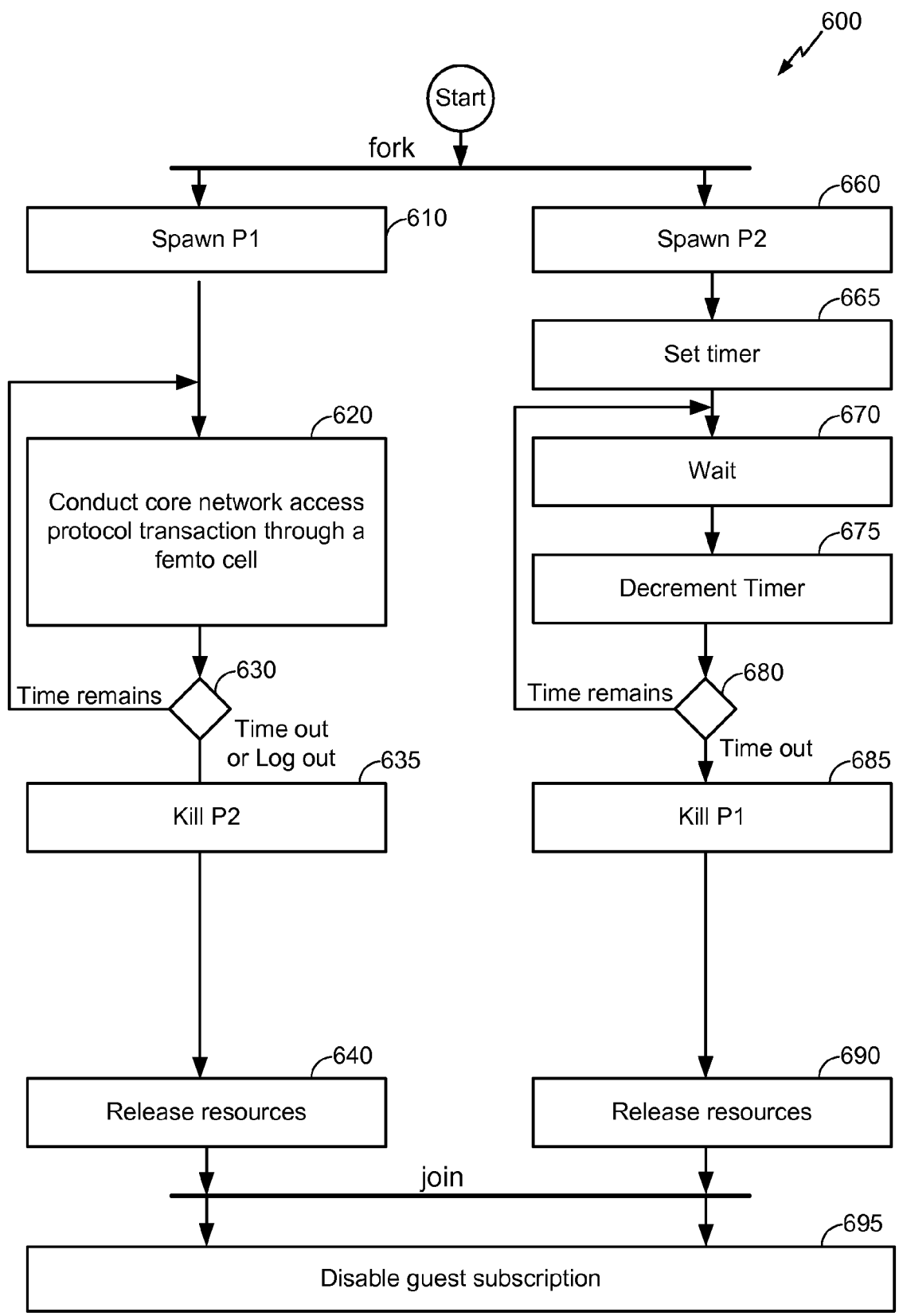
FIG. 6 illustrates a flow diagram of an exemplary communication system to establish and terminate network access to a guest terminal device, according to one embodiment.

FIG. 6 is a flow diagram for a system 600 for managing femto cell network access to a guest terminal device, in accordance with one embodiment. As an option, the present system 600 may be implemented in the context of the architecture and functionality of FIG. 1 through FIG. 5. Of course, however, the system 600 or any operation therein may be carried out in any desired environment.

Of course, as aforementioned, network access to the macro mobile operator core network 250 might be time-limited. Accordingly, embodiments of the present invention include use of techniques to limit access based on time, possibly including use of a timestamp. As shown in FIG. 6 one technique for time-based management might employ multiple processes running concurrently and asynchronously. Specifically, the operation for establishing network access to a guest terminal device might include spawning concurrently running processes P1 and P2 (operations 610 and 660, respectively).

In the general case of authorized network access to the macro mobile operator core network 250, the guest terminal device is able to use the network for any purposes supported under the guest's subscription agreement, possibly including cell-to-cell calls, cell-to-landline calls, SMS messaging, Internet accesses such as browsing or chat, roaming between any number of authorized femto cells, etc., at least for the period of validity. Such general access is supported in the context of embodiments of the present invention so long as the period of validity has not expired (see operation 620 and decision 630). However upon expiration of the period of validity, general network access will be terminated and various guest-related resources released (operations 635, 685, 640 and 690).

In parallel with authorized network access, a timer initialize (operation 665) and time monitoring steps (operations 670, 675 and decision 680) enforces that network access through the subject femto cells is terminated at the expiration of the period of validity. Of course, termination of guest status authorizing network access through the subject femto cells does not necessarily further terminate other network access and, in general, upon termination of guest status, the guest terminal device may be redirected to alternate network access mechanisms. Upon expiration of validity, the macro mobile operator core network 250 disables the guest subscription (operation 695). Similarly, the guest terminal device may delete the corresponding FDE entry from its database.

Figure 7A:
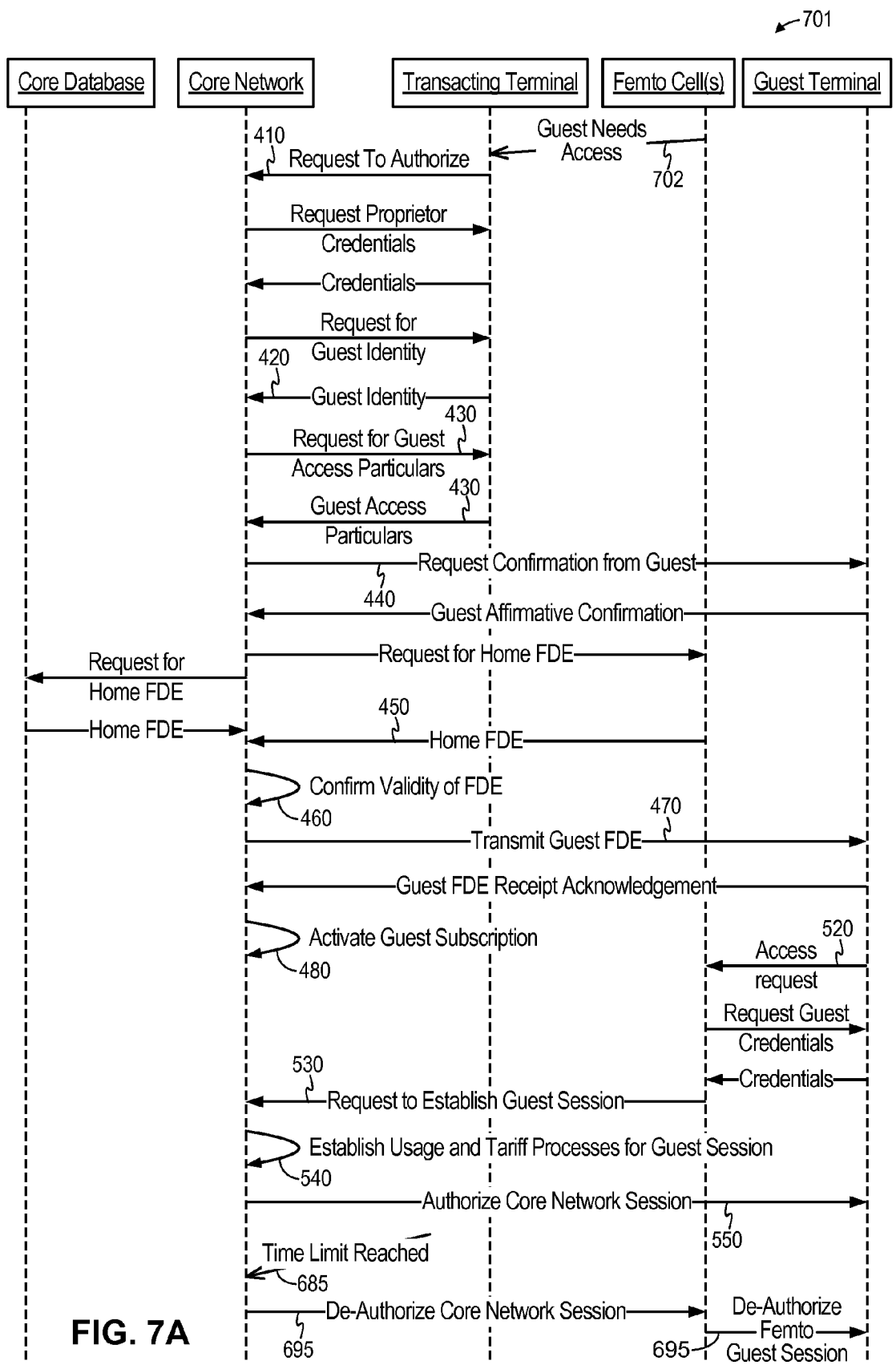
FIG. 7A illustrates an exemplary communication protocol to enable deployment of access point base stations within a network environment, according to one embodiment.

FIG. 7A illustrates a protocol 701 for managing femto cell network access to a guest terminal device, in accordance with one embodiment. As an option, the protocol 701 may be implemented in the context of the architecture and functionality of FIG. 1 through FIG. 6. Of course, however, the protocol 701 or any operation therein may be carried out in any desired environment.

As shown in FIG. 7A, at transaction step 702, the femto cell transmits a request to the transacting terminal that a guest terminal needs access. The protocol transactions may be understood by interpreting from top to bottom by reading each next (successively lower) transaction, or it can be understood from the perspective of a particular contributor (e.g. the "Transacting Terminal"). For example, the Transacting Terminal operates transaction steps including (a) sending a request to authorize a guest terminal 410; and (b) sending guest terminal identity; optionally (c) sending guest access information. As another example, from the perspective of the femto cell (i.e. the "Femto Cell"), transaction steps can be described as including (a) receiving a guest request 520; (b) receiving guest credentials; (c) establishing a femto-based guest session; and (d) de-authorize a femto-based guest session. Similarly, from the perspective of the guest terminal device (i.e. the "Guest Terminal"), transaction steps can be described as including (a) receiving an access confirmation request 440; (b) transacting an access confirmation request confirmation; and (c) requesting a femto-based guest session.

It should be appreciated that the teachings herein may be implemented in various types of communication devices. In some aspects, the teachings herein may be implemented in wireless devices that may be deployed in multiple access communication system that may simultaneously support communication for multiple wireless access terminals. Here, each terminal may communicate with one or more access points via transmissions on the forward and reverse links. The forward link (or downlink) refers to the communication link from the access points to the terminals, and the reverse link (or uplink) refers to the communication link from the terminals to the access points. This communication link may be established via a single-in-single-out system, a multiple-in-multiple-out ("MIMO") system, or some other type of system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system may provide improved performance (e.g., higher throughput and/or greater reliability) if the additional dimensionalities created by the multiple transmit and receive antennas are utilized.

A MIMO system may support time division duplex ("TDD") and frequency division duplex ("FDD"). In a TDD system, the forward and reverse link transmissions are on the same frequency region so that the reciprocity principle allows the estimation of the forward link channel from the reverse link channel. This enables the access point to extract transmit beam-forming gain on the forward link when multiple antennas are available at the access point.

Figure 7B:
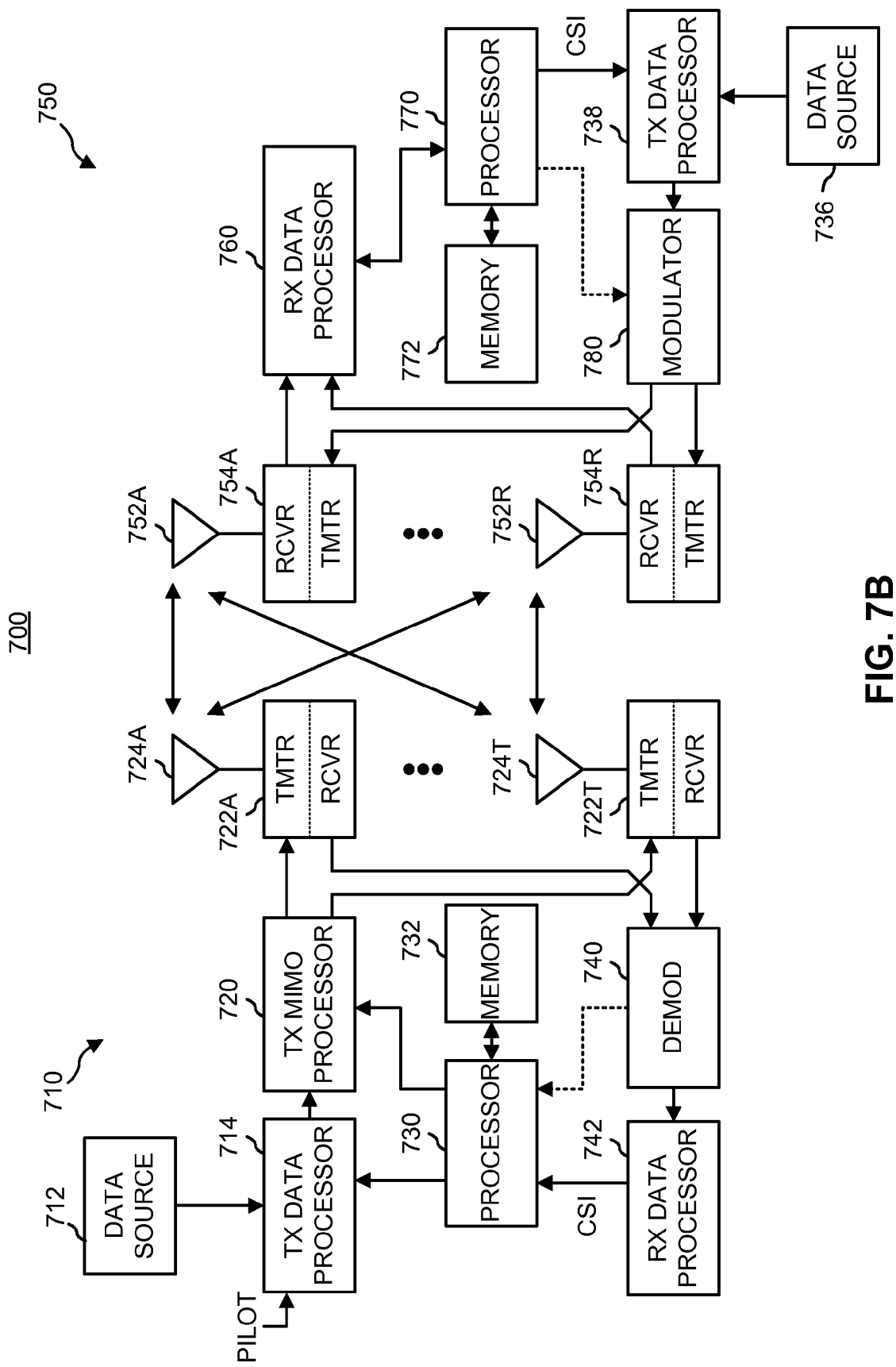
FIG. 7B illustrates a simplified block diagram of several sample aspects of communication components.

The teachings herein may be incorporated into a node (e.g., a device) employing various components for communicating with at least one other node. FIG. 7B depicts several sample components that may be employed to facilitate communication between nodes. Specifically, FIG. 7B illustrates a wireless device 710 (e.g., an access point) and a wireless device 750 (e.g., an access terminal) of a MIMO system 700. At the device 710, traffic data for a number of data streams is provided from a data source 712 to a transmit ("TX") data processor 714.

In some aspects, each data stream is transmitted over a respective transmit antenna. The TX data processor 714 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped)

based on a particular modulation scheme (e.g., BPSK, QSPK, M-PSK, or M-QAM) selected for that data stream to provide modulation symbols. The data rate, coding, and modulation for each data stream may be determined by instructions performed by a processor 730. A data memory 732 may store program code, data, and other information used by the processor 730 or other components of the device 710.

The modulation symbols for all data streams are then provided to a TX MIMO processor 720, which may further process the modulation symbols (e.g., for OFDM). The TX MIMO processor 720 then provides $N_T$ modulation symbol streams to $N_T$ transceivers ("XCVR") 722A through 722T. In some aspects, the TX MIMO processor 720 applies beam-forming weights to the symbols of the data streams and to the antenna from which the symbol is being transmitted. Each transceiver 722 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transceivers 722A through 722T are then transmitted from $N_T$ antennas 724A through 724T, respectively.

At the device 750, the transmitted modulated signals are received by $N_R$ antennas 752A through 752R and the received signal from each antenna 752 is provided to a respective transceiver ("XCVR") 754A through 754R. Each transceiver 754 conditions (e.g., filters, amplifies, and downconverts) a respective received signal, digitizes the conditioned signal to provide samples, and further processes the samples to provide a corresponding "received" symbol stream.

A receive ("RX") data processor 760 then receives and processes the $N_R$ received symbol streams from $N_R$ transceivers 754 based on a particular receiver processing technique to provide $N_T$ "detected" symbol streams. The RX data processor 760 then demodulates, deinterleaves, and decodes each detected symbol stream to recover the traffic data for the data stream. The processing by the RX data processor 760 is complementary to that performed by the TX MIMO processor 720 and the TX data processor 714 at the device 710.

A processor 770 periodically determines which pre-coding matrix to use (discussed below). The processor 770 formulates a reverse link message comprising a matrix index portion and a rank value portion. A data memory 772 may store program code, data, and other information used by the processor 770 or other components of the device 750.

The reverse link message may comprise various types of information regarding the communication link and/or the received data stream. The reverse link message is then processed by a TX data processor 738, which also receives traffic data for a number of data streams from a data source 736, modulated by a modulator 780, conditioned by the transceivers 754A through 754R, and transmitted back to the device 710.

At the device 710, the modulated signals from the device 750 are received by the antennas 724, conditioned by the transceivers 722, demodulated by a demodulator ("DE-MOD") 740, and processed by a RX data processor 742 to extract the reverse link message transmitted by the device 750. The processor 730 then determines which pre-coding matrix to use for determining the beam-forming weights then processes the extracted message.

The teachings herein may be incorporated into various types of communication systems and/or system components. In some aspects, the teachings herein may be employed in a multiple-access system capable of supporting communication with multiple users by sharing the available system resources (e.g., by specifying one or more of bandwidth, transmit power, coding, interleaving, and so on). For example, the teachings herein may be applied to any one or combinations of the following technologies: Code Division Multiple Access ("CDMA") systems, Multiple-Carrier CDMA ("MCCDMA"), Wideband CDMA ("W-CDMA"), High-Speed Packet Access ("HSPA," "HSPA+") systems, Time Division Multiple Access ("TDMA") systems, Frequency Division Multiple Access ("FDMA") systems, Single-Carrier FDMA ("SC-FDMA") systems, Orthogonal Frequency Division Multiple Access ("OFDMA") systems, or other multiple access techniques. A wireless communication system employing the teachings herein may be designed to implement one or more standards, such as IS-95, cdma2000, IS-856, W-CDMA, TDSCDMA, and other standards. A CDMA network may implement a radio technology such as Universal Terrestrial Radio Access ("UTRA)", cdma2000, or some other technology. UTRA includes W-CDMA and Low Chip Rate ("LCR"). The cdma2000 technology covers IS-2000, IS-95 and IS-856 standards. A TDMA network may implement a radio technology such as Global System for Mobile Communications ("GSM"). An OFDMA network may implement a radio technology such as Evolved UTRA ("E-UTRA"), IEEE 802.11, IEEE 802.16, IEEE 802.20, Flash-OFDM®, etc. UTRA, E-UTRA, and GSM are part of Universal Mobile Telecommunication System ("UMTS"). The teachings herein may be implemented in a 3GPP Long Term Evolution ("LTE") system, an Ultra-Mobile Broadband ("UMB") system, and other types of systems. LTE is a release of UMTS that uses E-UTRA. Although certain aspects of the disclosure may be described using 3GPP terminology, it is to be understood that the teachings herein may be applied to 3GPP (Re199, Re15, Re16, Re17) technology, as well as 3GPP2 (IxRTT, 1xEV-DO Re1O, RevA, RevB) technology and other technologies.

The teachings herein may be incorporated into (e.g., implemented within or performed by) a variety of apparatuses (e.g., nodes). In some aspects, a node (e.g., a wireless node) implemented in accordance with the teachings herein may comprise an access point or an access terminal.

For example, an access terminal may comprise, be implemented as, or known as user equipment, a subscriber station, a subscriber unit, a mobile station, a mobile, a mobile node, a remote station, a remote terminal, a user terminal, a user agent, a user device, or some other terminology. In some implementations an access terminal may comprise a cellular telephone, a cordless telephone, a session initiation protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music device, a video device, or a satellite radio), a global positioning system device, or any other suitable device that is configured to communicate via a wireless medium.

An access point may comprise, be implemented as, or known as a NodeB, an eNodeB, a radio network controller ("RNC"), a base station ("BS"), a radio base station ("RBS"), a base station controller ("BSC"), a base transceiver station ("BTS"), a transceiver function ("TF"), a radio transceiver, a radio router, a basic service set ("BSS"), an extended service set ("ESS"), or some other similar terminology.

In some aspects a node (e.g., an access point) may comprise an access node for a communication system. Such an access node may provide, for example, connectivity for or to a network (e.g., a wide area network such as the Internet or a cellular network) via a wired or wireless communication link to the network. Accordingly, an access node may enable another node (e.g., an access terminal) to access a network or some other functionality. In addition, it should be appreciated that one or both of the nodes may be portable or, in some cases, relatively non-portable.

Also, it should be appreciated that a wireless node may be capable of transmitting and/or receiving information in a non-wireless manner (e.g., via a wired connection). Thus, a receiver and a transmitter as discussed herein may include appropriate communication interface components (e.g., electrical or optical interface components) to communicate via a non-wireless medium.

A wireless node may communicate via one or more wireless communication links that are based on or otherwise support any suitable wireless communication technology. For example, in some aspects a wireless node may associate with a network. In some aspects the network may comprise a local area network or a wide area network. A wireless device may support or otherwise use one or more of a variety of wireless communication technologies, protocols, or standards such as those discussed herein (e.g., CDMA, TDMA, OFDM, OFDMA, WiMAX, Wi-Fi, and so on). Similarly, a wireless node may support or otherwise use one or more of a variety of corresponding modulation or multiplexing schemes. A wireless node may thus include appropriate components (e.g., air interfaces) to establish and communicate via one or more wireless communication links using the above or other wireless communication technologies. For example, a wireless node may comprise a wireless transceiver with associated transmitter and receiver components that may include various components (e.g., signal generators and signal processors) that facilitate communication over a wireless medium.

Figure 8:
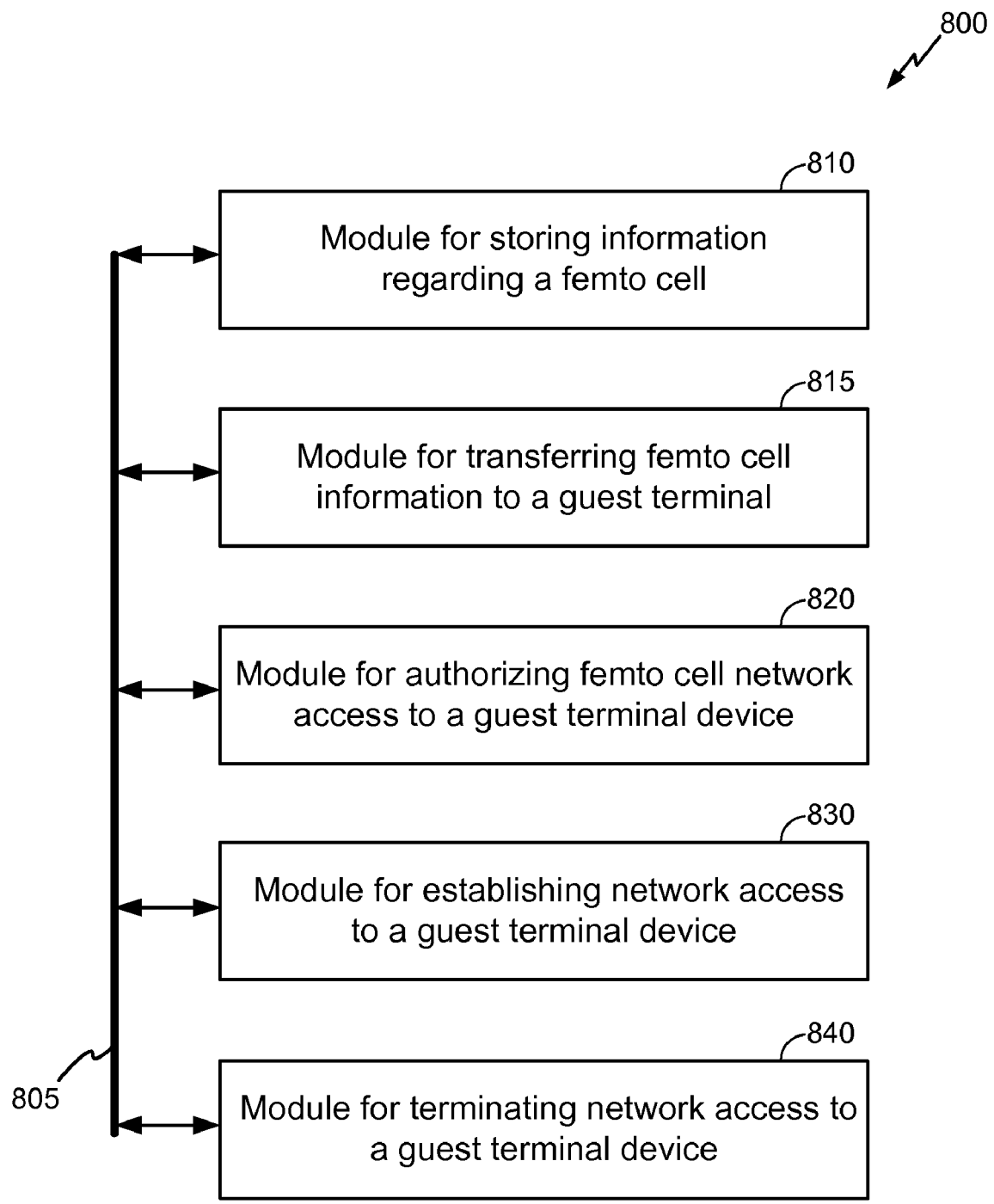
FIGS. 8, 9, and 10 are simplified block diagrams of several sample aspects of apparatuses configured to facilitate transaction of femto cell information as taught in embodiments herein.

FIG. 8 depicts an example block diagram of a system 800 in accordance with additional aspects described herein. System 800 provides an apparatus that can facilitate managing guest terminal access through a femto cell. Specifically, system 800 can include a plurality of modules or means, each connected to a communication link 805, and can communicate with other modules or means over communication link 805. The modules of the apparatus can individually or in combination perform the steps of the flow 300.

Figure 9:
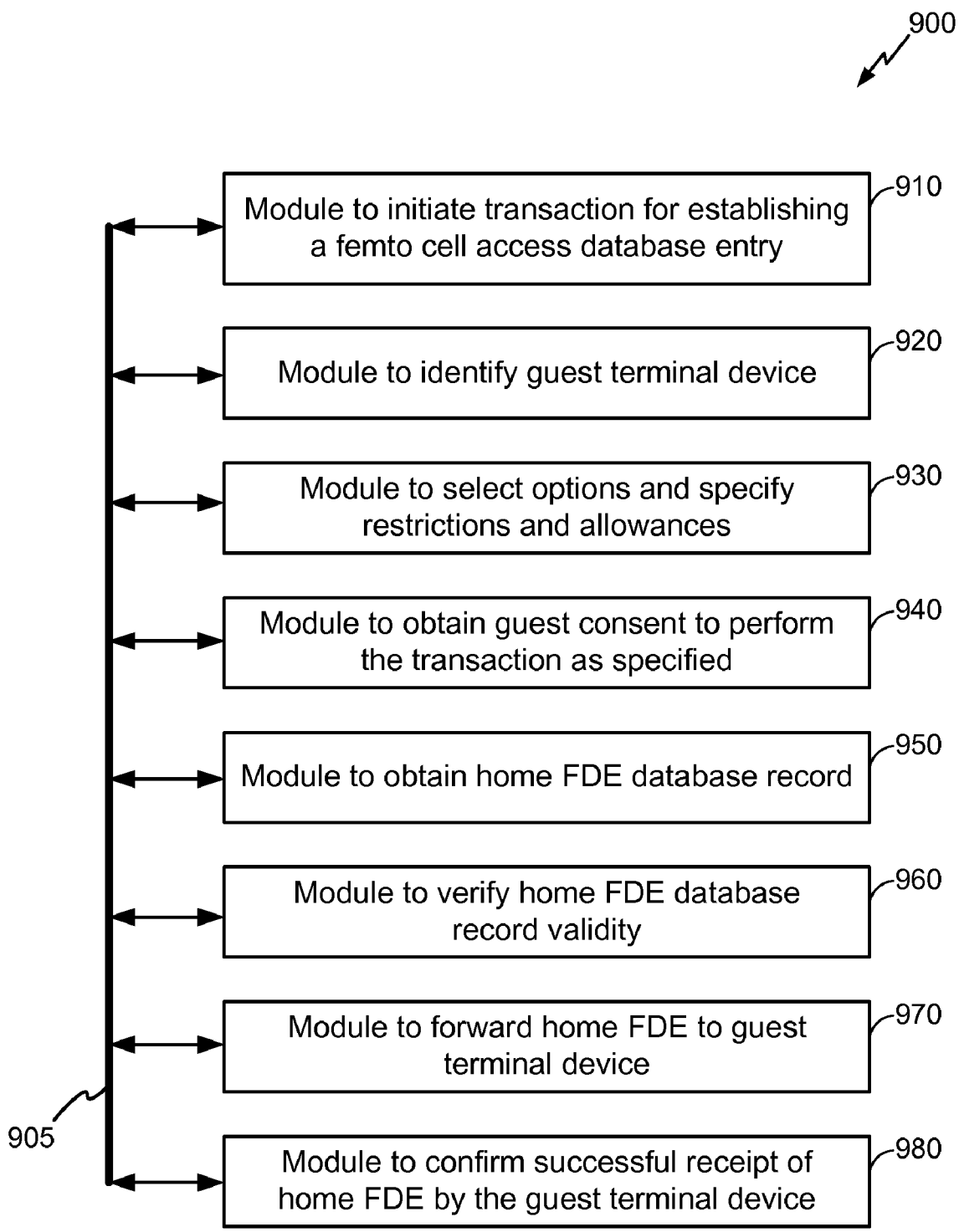

FIG. 9 depicts an example block diagram of a system 900 in accordance with additional aspects described herein. System 900 provides an apparatus that can facilitate transferring femto cell information to a guest terminal. Specifically, system 900 can include a plurality of modules or means, each connected to a communication link 905, and can communicate with other modules or means over communication link 905. The modules of the apparatus can individually or in combination perform the steps of the flow 400. For example, the apparatus of system 900 can initiate any number of transactions for establishing a femto cell access database entry 910, and can perform any number of transactions to configure a guest terminal device, including confirming successful receipt of communications by a guest terminal device 980.

Figure 10:
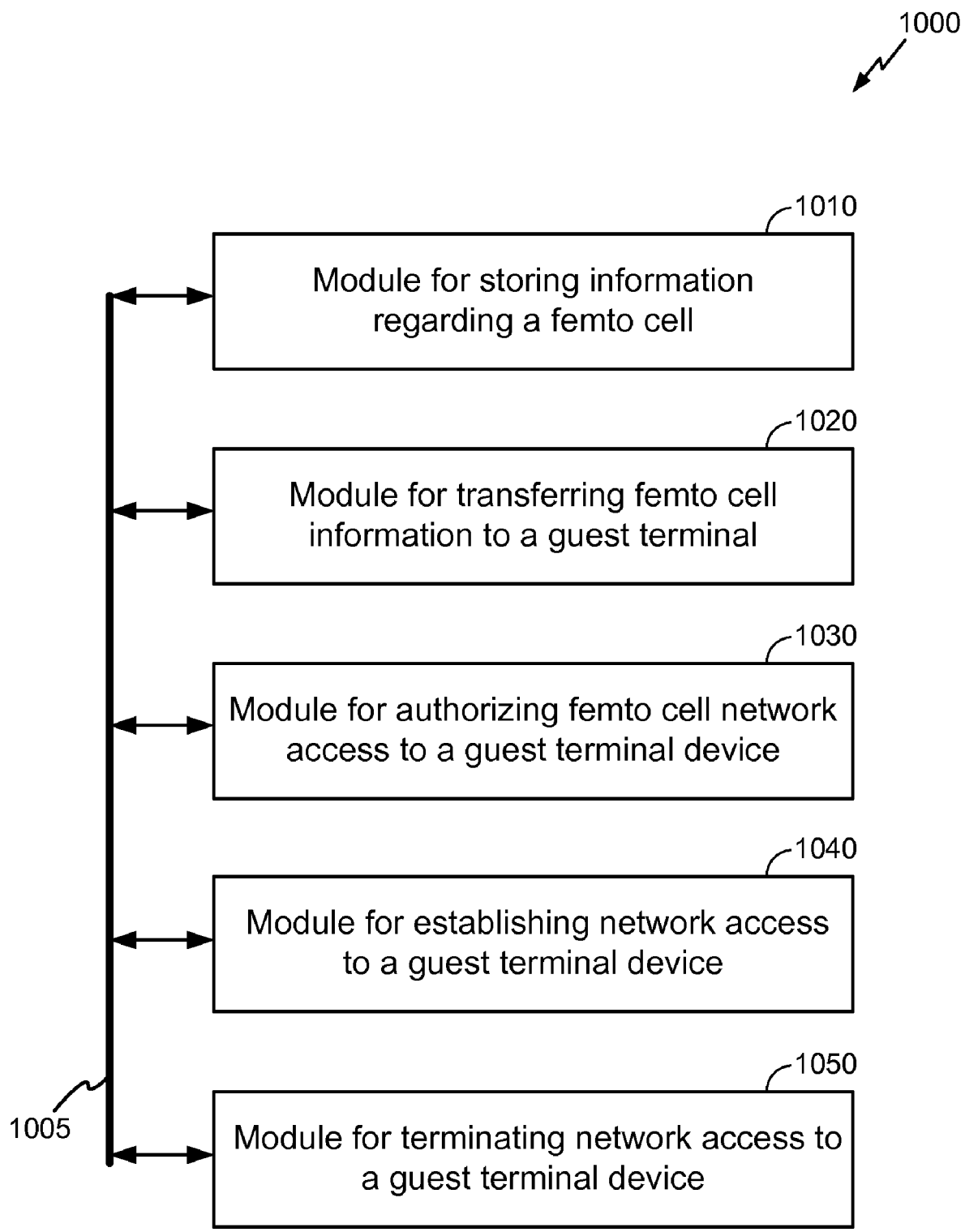

FIG. 10 depicts an example block diagram of a system 1000 in accordance with additional aspects described herein. System 1000 provides an apparatus that can facilitate transferring femto cell information to a guest terminal. Specifically, system 1000 can include a plurality of modules or means, each connected to a communication link 1005, and can communicate with other modules or means over communication link 1005. The modules of the apparatus can, individually or in combination perform the steps of the flow 500. For example, the apparatus of system 1000 can manage guest terminal information retrieval 1010, search for femto cells 1020, as well as initiate usage and tariff processes 1030.

While the specification describes particular examples of the present invention, those of ordinary skill can devise variations of the present invention without departing from the inventive concept. For example, the teachings herein refer to a core network that may be comprised of any combination of circuit-switched network elements and packet-switched domain network elements.

Those skilled in the art will understand that information and signals may be represented using any of a variety of different technologies and techniques. For example data, instructions, commands, information, signals, bits, symbols, and chips that may be referenced throughout the above description may be represented by voltages, currents, electromagnetic waves, magnetic fields or particles, optical fields or particles, or any combination thereof.

Those skilled in the art will further appreciate that the various illustrative systems, logical blocks, modules, circuits, methods and algorithms described in connection with the examples disclosed herein may be implemented as electronic hardware, computer software, or combinations of both. To clearly illustrate this interchangeability of hardware and software, various illustrative components, blocks, modules, circuits, methods and algorithms have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative systems, logical blocks, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods or algorithms described in connection with the examples disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor. The processor and the storage medium may reside in an ASIC.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The previous description of the disclosed examples is provided to enable any person skilled in the art to make or use the present invention. Various modifications to these examples will be readily apparent to those skilled in the art, and the generic principles defined herein may be applied to other examples without departing from the spirit or scope of the invention. Thus, the present invention is not intended to be limited to the examples shown herein but is to be accorded the widest scope consistent with the principles and novel features disclosed herein.

The invention claimed is:

1. A method for managing core network access of a guest terminal device through at least one femto cell comprising:
   storing information regarding at least one femto cell, wherein said information includes information received from a subscriber terminal device that indicates duration of guest access validity and untariffed time limitations;
   transferring said information regarding said femto cell to said guest terminal device, wherein said information allows said guest terminal device to find said femto cell;
   authorizing at least one femto cell for use by said guest terminal device; and
   establishing network access through said femto cell to said guest terminal device using said information.

2. The method of claim 1, wherein authorizing said guest terminal device to access said femto cell comprises transferring said information from said subscriber terminal device to said core network.

3. The method of claim 1, wherein said establishing network access to said guest terminal device includes at least one of: access to Internet via broadband link, access to a core network-based application, and access to an internet-based application.

4. The method of claim 1, wherein said authorizing at least one femto cell for use by said guest terminal device includes a guest confirmation.

5. The method of claim 1, wherein said storing information regarding at least one femto cell comprises at least one of: a field for at least one specific terminal identification serial number, a bit for storing a guest status authorization, a field for storing at least one timestamp, a field for storing at least one femto cell ID, and a field for storing at least one femto constellation database entry.

6. The method of claim 1, wherein said storing information regarding at least one femto cell comprises providing fields for storing at least one of: an SID, an NID, a femto ID, a Macro BS set, a Pilot Ec/Io threshold vector, a mean pilot phase vector, and it pilot phase deviation vector.

7. The method of claim 1, wherein storing information regarding at least one femto cell comprises establishing at least one access database entry that includes at least one of: an explicit deny characteristic entry, a carrier deny entry, a core network application deny entry, an internet address deny entry, and an internet application deny entry.

8. The method of claim 1, wherein said authorizing at least one femto cell for use by a guest terminal device includes at least one of: a restricted mode, a promiscuous mode, a tariff-free mode, a tariff mode, a time-based access limitation mode, a pre-authorized guest mode, and a roaming mode for roaming between any number of authorized femto to cells.

9. The method of claim 1, wherein said establishing network access to said guest terminal device includes access using at least one of: CDMA, TDMA, FDMA, and GSM.

10. A wireless communication system for managing core network access of a guest terminal device through at least one femto cell comprising:
    a core network computing platform for storing information regarding at least one femto cell;
    a subscriber terminal device for identifying at least one guest terminal device and indicating duration of guest access validity and untariffed time limitations;
    at least one said guest terminal for receiving said information regarding said femto cell, wherein said information allows said guest terminal to find said femto cell; and
    at least one said femto cell for conducting network communication through said femto cell with said guest terminal device.

11. The wireless communication system of claim 10, wherein said core network computing platform for storing information regarding at least one femto cell includes information received from said subscriber terminal device.

12. The wireless communication system of claim 10, wherein said guest terminal for receiving said information comprises receiving said information from said core network.

13. The wireless communication system of claim 10, wherein said guest terminal for receiving said information includes receiving a guest confirmation.

14. The wireless communication system of claim 10, wherein said core network computing platform for storing information regarding at least one femto cell comprises storing at least one of: a field for at least one specific terminal identification serial number, a bit for a guest status authorization, a field for at least one timestamp, a field for storing at least one femto cell ID, and a field for storing at least one femto constellation database entry.

15. The wireless communication system of claim 10, wherein said core network computing platform for storing information regarding at least one femto cell comprises storing at least one of: an SID, an NID, a femto ID, a Macro BS set, a Pilot Ec/Io threshold vector, a mean pilot phase vector, and a pilot phase deviation vector.

16. fhe wireless communication system of claim 10, wherein said guest terminal for receiving said information regarding said femto cell includes receiving at least one of: a restricted mode, a promiscuous mode, a tariff-free mode, a tariff mode, a time-based access limitation mode, a pre-authorized guest mode, and a roaming.

17. The wireless communication system of claim 10, wherein said femto cell for conducting network communication includes conducting network communication using at least one of: CDMA, TDMA, FDMA, and GSM.

18. A computer program product comprising:
a non-transitory computer-readable medium comprising:
code for causing at least one computer to store information regarding at least one femto cell, wherein said information allows a guest terminal device to find said at least one femto cell and includes information received from a subscriber terminal device that indicates duration of guest access validity and untariffed time limitations;
code for causing at least one computer to authorize at least one said femto cell for use by said guest terminal device; and
code for causing at least one computer to de-authorize network access session through said into cell to said guest terminal device.

19. The computer program product of claim 18, wherein said computer-readable medium further comprises code for causing at least one computer to transfer said information from said subscriber terminal device to a core network.

20. The computer program product of claim 18, wherein said authorizing at least one femto cell for use by said guest terminal device includes a guest confirmation.

21. The computer program product of claim 18, wherein said computer-readable medium further comprises code for causing at least one computer to store at least one of: a field for at least one specific terminal identification serial number, a bit for storing a guest status authorization, a field for storing at least one timestamp, a field for storing at least one femto cell ID, and a field for storing at least one femto constellation database entry.

22. The computer program product of claim 18, wherein said computer-readable medium further comprises code for causing at least one computer to provide fields for storing at least one of: an SID, an NID, a femto ID, a Macro BS set, a Pilot Ec/Io threshold vector, a mean pilot phase vector, and a pilot phase deviation vector.

23. The computer program product of claim 18, wherein said computer-readable medium further comprises code for causing at least one computer to authorize at least one of: an explicit deny characteristic entry, a carrier deny entry, a core network application deny entry, an internet address deny entry, and an internet application deny entry.

24. The computer program product of claim 18, wherein said computer-readable medium further comprises code for causing at least one computer to authorize at least one of: a restricted mode, a promiscuous mode, a tariff-free mode, a tariff mode, a time-based access limitation mode, a pre-authorized guest mode, and a roaming mode for roaming between any number of authorized femto cells.

25. An apparatus for managing core network access of a guest terminal device through at least one femto cell comprising:
means for storing information regarding at least one femto cell, wherein said information includes information received from a subscriber terminal device that indicates duration of guest access validity and untariffed time limitations;
means for transferring said information regarding said femto cell to said guest terminal device, wherein said information allows said guest terminal device to find said femto cell;
means for authorizing at least one femto cell for use by said guest terminal device; and
means for establishing network access through said femto cell to said guest terminal device using said information.

26. The apparatus of claim 25, further comprising means for storing said information received from said subscriber terminal device.

27. The apparatus of claim 26, further comprising means for transferring said information from said subscriber terminal device to said core network.

28. The apparatus of claim 25, wherein said means for establishing network access to said guest terminal device further comprises at least one means of: access to Internet via broadband link, access to a core network-based application, and access to an internet-based application.

* * * * *